Sept. 6, 1960 W. H. COX 2,951,387
DRIVE MECHANISM
Filed Dec. 16, 1957
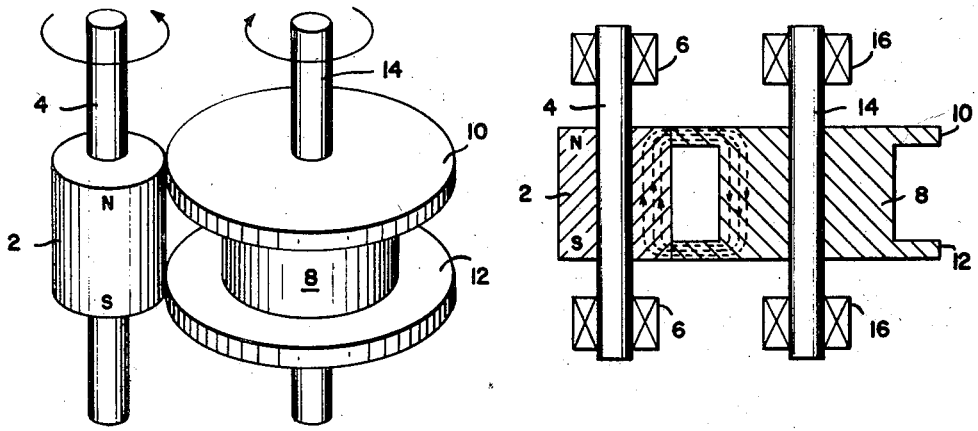
FIG. 1.
FIG. 2.
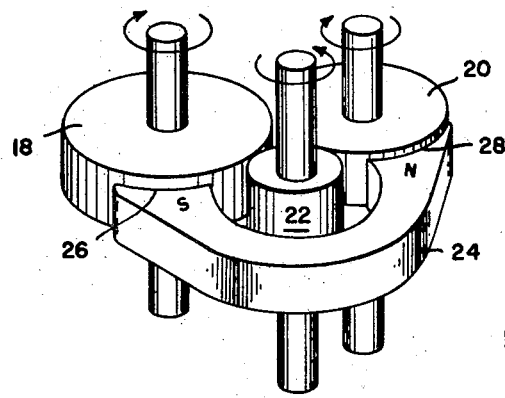
FIG. 3.
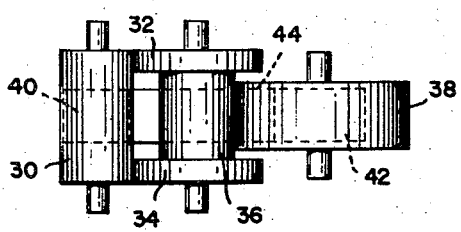
FIG. 4.
INVENTOR.
WILLIAM H. COX
BY
ATTORNEYS

United States Patent Office 2,951,387
Patented Sept. 6, 1960

2,951,387

DRIVE MECHANISM

William H. Cox, Beaumont, Tex., assignor to Sun Oil Company, Philadelphia, Pa., a corporation of New Jersey Filed Dec. 16, 1957, Ser. No. 703,139

1 Claim. (Cl. 74—210)

This invention relates to drive mechanism and particularly to means for driving one shaft by another without the use of gears and with avoidance of thrust loadings on the shaft bearings.

It is sometimes necessary to effect driving between shafts under conditions which require a very high degree of uniformity of drive. An example of this is presented by recorders and reproducers of photoelectric or magnetic type in which any irregularity of the drive will appear as a modulation of the signal which is being recorded or reproduced. Gearing, in particular, involves even under conditions of use of very high precision gearing some objectionable modulation which is particularly undesirable when frequency modulated signals are involved. Friction drives are accordingly commonly used, but these not only involve non-uniformity in drive in many cases, but particularly require that the rotary engaging elements must be rather tightly pressed together to minimize slippage with the production of side thrusts at the bearings and substantial friction thereat. Quick starting and stopping is usually a consideration, and starting involves the imposition of a load on the driving motor due to the friction at the bearings, and if this friction is held to the minimum permissible value there will occur slippage both in starting and stopping.

It is the general object of the present invention to provide drive mechanism in which the faults mentioned above are substantially eliminated. In brief, traction is produced by the exertion of magnetic forces between driving and driven members which by reason of the use of such force may be of smooth cylindrical contour without any necessity for providing friction by resiliency as by the common use of members one of which is faced with rubber or other friction material. The magnetic force exerted between the engaging members is applied without corresponding thrust involved at bearings. Slippage is a minimum, and quick starting and stopping may be effected.

The attainment of the objects of the invention will become apparent from the following description, read in conjunction with the accompanying drawing, in which:

Figure 1 is a perspective view showing driving and driven elements provided in accordance with the invention;

Figure 2 is an axial section of the arrangement shown in Figure 1 with bearings indicated;

Figure 3 is a perspective view showing another embodiment of the invention; and

Figure 4 is an elevation showing a further modification of the invention.

Referring first to Figures 1 and 2, there is indicated at 2 a cylindrical member mounted on a shaft 4 which may be mounted in suitable bearings 6. The member 2 is a cylinder of hard magnetic material permanently magnetized, with the north and south poles provided at its ends. Engaging the member 2 is a spool-like member 8 provided with cylindrical flanges 10 and 12 arranged to engage the ends of the member 2 as shown. The member 8 is mounted on a shaft 14 which is in turn mounted in suitable bearings 16. While either of the members may be the driving member, the other being driven, it may be assumed that the drive is such that the member 2 is the driving member and arranged to effect drive of the shaft 14 with a speed reduction proportional to the ratio of the diameter of member 2 to the diameter of the flanges 10 and 12. The magnetic flux path indicated in Figure 2 by the lines carrying arrows provides a strong pull between the members to provide effective traction even though the cylindrical engaging surfaces are of mechanically hard material, both for example being steel with that of member 2 of permanently magnetizable type while that of the member 8 is of "soft" magnetic material which will not retain a fixed polarity. Despite the fact that the materials are mechanically hard a quite positive non-slipping drive is provided between them, the magnetism providing a strong pull maintaining them in contact.

For optimum operation, the bearings 6 and 16 are desirably so arranged that at least one pair of them is freely transversely movable so that despite the strong force of attraction between the members there will be no substantial transverse loading of the bearings. Whatever load exists in a transverse direction will be merely that imposed by the rotary drive conditions and not provided to produce a strong frictional engagement. Due to the fact that the materials of the members may be accurately machined to desired cylinders, then drive ratio may be quite accurately predetermined and the transmission of rotation will be highly uniform and without substantial slippage. The result is that if the driven shaft drives a record medium such as a magnetic tape or photographic film or the like there will be avoided frequency modulation of the record or its reproduction.

If the recording medium is very thin it may, in fact, be advanced by its interposition between members such as 2 and 8. While providing a slight gap in the magnetic circuit, there will nevertheless, be quite effective drive. In the case of a magnetic tape, of course, the arrangement must be so made that the record channel is sufficiently removed from the magnetic field involved in the members so as not to be erased or modified.

As has been indicated, for best results, the bearings of one of the members must have the possibility of a slight transverse freedom of floating motion. Under some conditions this is not permissible, since the input and output axes must be accurately maintained in fixed relationship. Figure 3 illustrates an arrangement in which by the interposition of an idler capable of lateral floating input and output shafts may be definitely positioned. In this modification a driving member 18 is arranged to drive the driven member 20 through the intermediate idler 22, all three of these members being made of soft magnetic material machined to provide accurately cylindrical surfaces. The bearings for the members 18 and 20 may be fixed while that of the idler 22 has freedom of lateral movement. To provide the magnetic interengagement of the members, a strong permanent magnet 24 has its pole ends 26 and 28 arranged concentrically with and extending about portions of the circumferences of the members 18 and 20. Small air gaps are here desirable and it is also desirable to have the pole areas as large as conveniently possible. There is then only a relatively small magnetic pull between the members 18 and 20 and the adjacent pole faces. This follows from the fact that magnetic pull is proportional to the square of the flux density and to the first power of area. The result is that for a given total flux the force is inversely proportional to the area. Thus, transverse loading of the bearings for the shafts of the members 18 and 20 is minimized. The magnetic path is, of course, completed through the idler 22 and between it and each of the members 18 and 20 there is a strong magnetic force providing the type of traction already described.

While a permanent magnet 24 has been illustrated, it will be evident that this may be replaced by an electromagnet and this may be particularly desirable when it is desired to effect quick stopping and unloading of the drive of the entire system. It will be evident that in similar fashion the member 2 shown in Figures 1 and 2 might be surrounded by a winding to provide the magnetic field.

Figure 4 shows still another arrangement in which a two-stage ratio change may be produced. In this case it may be assumed that the member 30 of small diameter drives the large diameter flanges 32 and 34 of an intermediate member while a small diameter portion 36 of this intermediate member drives the relatively large diameter member 38. In this arrangement, the members may be assumed to be of soft magnetic material and the field is provided by a magnet 44 the poles 40 and 42 of which have large areas adjacent to the members 30 and 38 as in the case of the arrangement shown in Figure 3. In the modification shown in Figure 4 the intermediate member is desirably arranged with transversely floating bearings, while the bearings of the members 30 and 38 maintain their axes fixed.

It will be evident from the foregoing that various changes in the details of arrangement may be made without departing from the invention as defined in the following claim.

What is claimed is:

Drive mechanism comprising a pair of cylindrical members, a third cylindrical member operatively interposed between said pair of cylindrical members, said pair of cylindrical members being disposed in spaced relation to one another and all of said cylindrical members being of soft magnetic metal that will not retain a fixed polarity, and being revoluble about parallel axes, the axes of said pair of cylindrical members being fixed, and said third cylindrical member being freely movable in a direction normal to its axis toward both of said pair of cylindrical members at one and the same time for contact therewith, and a magnet disposed with said cylindrical members in series in its field, whereby said cylindrical members are held in contact with one another exclusively through the influence of said magnetic flux.

References Cited in the file of this patent

UNITED STATES PATENTS

| | | |
|---|---|---|
| 750,009 | Thordon | Jan. 19, 1904 |
| 831,685 | Rossman | Sept. 25, 1906 |
| 982,789 | Bowie | Jan. 31, 1911 |
| 2,167,641 | Dewan | Aug. 1, 1939 |
| 2,204,887 | Dewan | June 18, 1940 |
| 2,441,693 | Eastman | May 18, 1948 |
| 2,573,506 | Stokes | Oct. 30, 1951 |
| 2,626,528 | Keller | Jan. 27, 1953 |
| 2,679,782 | Ryder | June 1, 1954 |
| 2,803,968 | Van Tilburg | Aug. 27, 1957 |

FOREIGN PATENTS

| | | |
|---|---|---|
| 234,068 | Germany | Apr. 29, 1911 |
| 305,292 | Germany | Apr. 23, 1918 |
| 306,008 | Germany | June 7, 1918 |
| 776,310 | Great Britain | June 5, 1957 |